United States Patent [19]

Harwood

[11] Patent Number: 4,625,233

[45] Date of Patent: Nov. 25, 1986

[54] I-PHASE FLESHTONE CORRECTION SYSTEM USING R-Y, G-Y AND B-Y COLOR DIFFERENCE SIGNAL DEMODULATORS

[75] Inventor: Leopold A. Harwood, Somerset County, N.J.

[73] Assignee: RCA Corporation, Princeton, N.J.

[21] Appl. No.: 748,756

[22] Filed: Jun. 26, 1985

[51] Int. Cl.$^4$ .............................................. H04N 9/64
[52] U.S. Cl. ......................................... 358/28; 358/23
[58] Field of Search .................................... 358/23, 28

[56]  References Cited

U.S. PATENT DOCUMENTS

| Re. 26,202 | 5/1967  | Loughlin .          |        |
|------------|---------|---------------------|--------|
| 3,619,487  | 11/1971 | Norley              | 358/28 |
| 3,651,418  | 3/1972  | Wiltmann            | 358/23 |
| 3,816,846  | 6/1974  | Nero et al.         | 358/23 |
| 3,996,608  | 12/1976 | Harwood             | 358/28 |
| 4,118,741  | 10/1978 | Gomi et al.         | 358/28 |
| 4,122,491  | 10/1978 | Yamaguchi et al.    | 358/23 |
| 4,207,589  | 6/1980  | Kawasaki            | 358/28 |
| 4,237,478  | 12/1980 | Engel et al.        | 358/23 |
| 4,272,778  | 6/1981  | Harwood et al.      | 358/23 |

OTHER PUBLICATIONS

RCA Service Data Bulletin for CTC-131 Color Television Receiver, file 1984.

Primary Examiner—John W. Shepperd
Attorney, Agent, or Firm—P. J. Rasmussen; P. M. Emanuel; R. H. Kurdyla

[57]  ABSTRACT

In a chrominance signal demodulating system a locally regenerated chrominance subcarrier signal is phase shifted to produce R-Y, G-Y and B-Y phase subcarrier signals, which are applied to respective color difference signal demodulators together with the chrominance signal to be demodulated for producing demodulated R-Y, G-Y and B-Y color image difference signals. The subcarrier signal is at the "I" phase and is processed by an automatic flesh tone correction network responsive to chrominance signal phases in the vicinity of I phase.

5 Claims, 3 Drawing Figures

I-PHASE FLESHTONE CORRECTION SYSTEM USING R-Y, G-Y AND B-Y COLOR DIFFERENCE SIGNAL DEMODULATORS

This invention concerns apparatus for demodulating the chrominance component of a color television signal. In particular, this invention concerns such apparatus in a system including an automatic flesh tone color correction network operative with respect to the "I" phase of a color subcarrier reference signal.

In conventional color television receivers, red, green and blue color image representative signals (R,G,B) supplied to an image reproducing kinescope of the receiver are formed by combining the luminance signal component (Y) of a received composite color television signal with respective ones of a set of color image difference signals R-Y, G-Y and B-Y. In receivers according to NTSC broadcast standards such as used in the U.S., the latter color difference signals can be recovered by chrominance signal demodulation along the so-called "I" and "Q" phase demodulation axes. Demodulation along the I and Q axes may be chosen to facilitate the use of a flesh-tone color correction sytem of the type shown in U.S. Pat. No. 3,996,608 of L. A. Harwood. One system for deriving R-Y, G-Y and B-Y color image difference signals subsequent to I, Q demodulation is described in U.S. Pat. No. 4,272,778 of L. A. Harwood et al. Although the system described in this patent has advantages as described therein, such system exhibits certain complexities with respect to developing color image difference signals and ultimately R, G and B color image signals from the demodulated I and Q signals, thereby increasing the likelihood that signal processing errors will result unless corrective steps are taken.

In the practical design of color television receivers it is desirable for the R, G and B color image signals applied to the kinescope to be developed with as few as possible DC offset errors and AC amplitude errors, such as may be associated with DC translation and matrixing circuits, since such errors detract from faithful color image reproduction. Thus it is desirable to accomplish chrominance signal demodulation without unnecessary complexity so as to minimize AC and DC signal processing errors. This objective is achieved by the disclosed demodulating apparatus according to the present invention, wherein color image difference signals are produced by demodulating plural color difference subcarrier signals which are developed from the chrominance subcarrier reference signal.

More specifically, in accordance with the principles of the present invention, a locally regenerated chrominance subcarrier reference signal is translated, such as by means of a matrix network and phase shifting networks, to produce R-Y, G-Y and B-Y color difference subcarrier signals. The color difference subcarrier signals are applied to respective color difference signal demodulators, which also receive the chrominance signal to be demodulated, for producing output demodulated R-Y, G-Y and B-Y color image difference signals.

In a preferred embodiment of the invention, the phase of the locally regenerated subcarrier signal is along the "I" phase demodulation axis and is subject to being modified in phase to produce a correct flesh tone in a reproduced color image.

Figure 1:
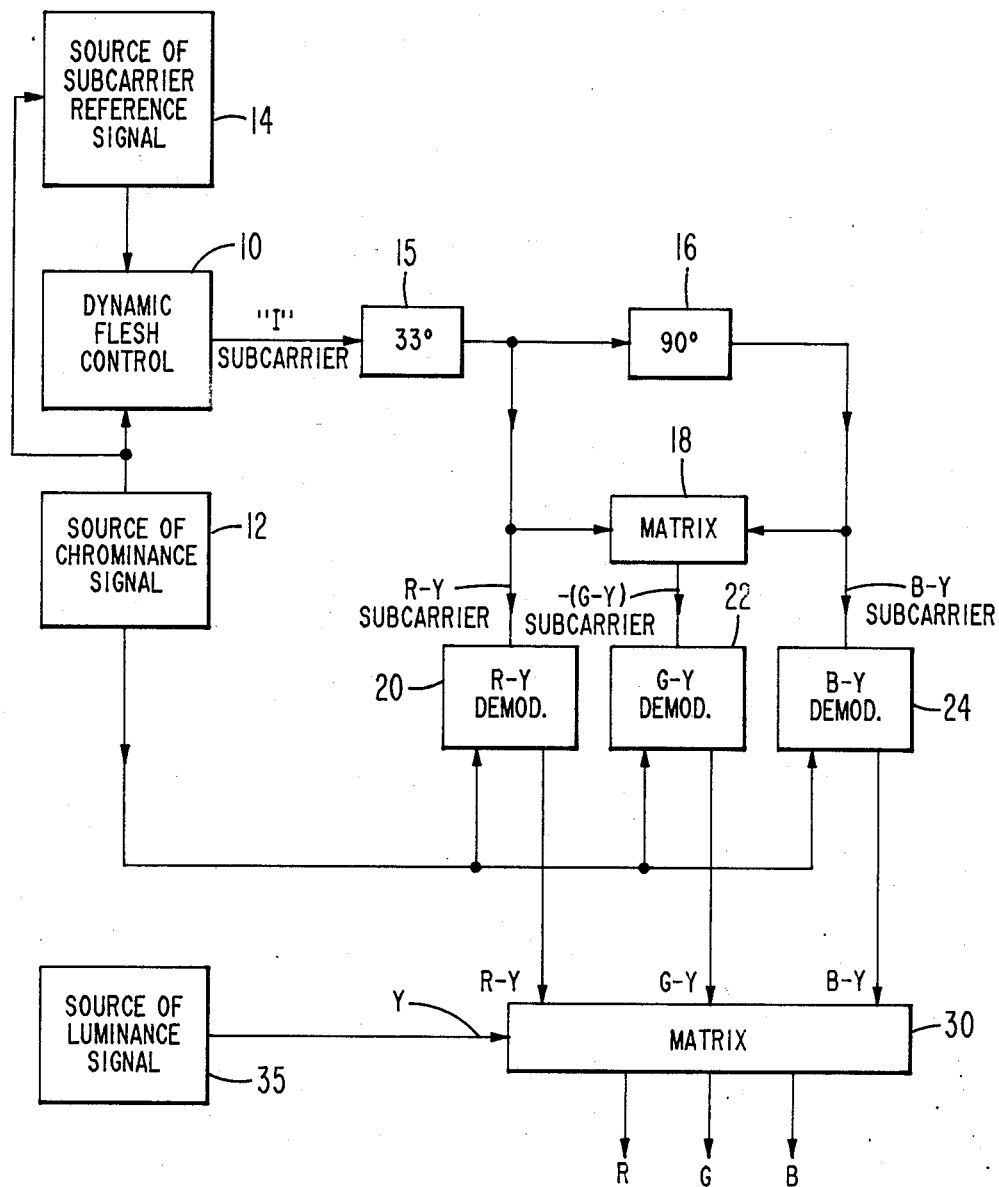
FIG. 1 illustrates, in block diagram form, a portion of a color television receiver including chrominance signal demodulating apparatus according to the present invention.

In FIG. 1, a dynamic flesh-tone control unit 10 receives a modulated chrominance information signal from a source 12 (comprising, e.g., the chrominance output of a luminance/chrominance signal separator circuit following the video signal detector in a color television receiver), and a locally regenerated chrominance subcarrier reference signal from a source 14. Source 14 has an input for receiving chrominance signals from source 12, and includes a voltage controlled oscillator (VCO) which regenerates a continuous wave output reference signal from the burst reference component which is customarily provided in a broadcast color television signal. The subcarrier signal output of the VCO is monitored by sampling and control circuits included in source 14 to assure that the subcarrier signal is locked in phase and frequency to the burst signal. In this example the phase of the subcarrier signal from source 14 is along the I phase demodulation axis, which at 123 degrees is displaced 33 degrees from the phase of the R-Y color difference signal between the burst signal phase and the R-Y signal phase. The burst signal phase corresponds to the phase of the −(B-Y) color difference signal. The I phase of the subcarrier signal is produced by a phase shifting network included in source 14, as will be explained in connection with FIG. 3.

Dynamic flesh-tone control unit 10 provides an output subcarrier signal which exhibits a correct flesh-tone phase when the chrominance signal from source 12 contains image information representing flesh tones, i.e., tones represented by signal information in the orange or "+I" phase region. Systems of this type are described, for example, in U.S. Pat. No. 3,996,608 of L. A. Harwood, in U.S. Pat. No. 3,663,744 of L. A. Harwood, and in U.S. Pat. No. 4,385,311 of L. A. Harwood et al., wherein a dynamic flesh tone control network suitable for use as network 10 provides an output subcarrier signal having a phase modified toward the phase of chrominance signals sensed as having a phase within a nominal range of flesh tone phase. Flesh tone control unit 10 will be described in greater detail in connection with FIG. 3.

Figure 3:
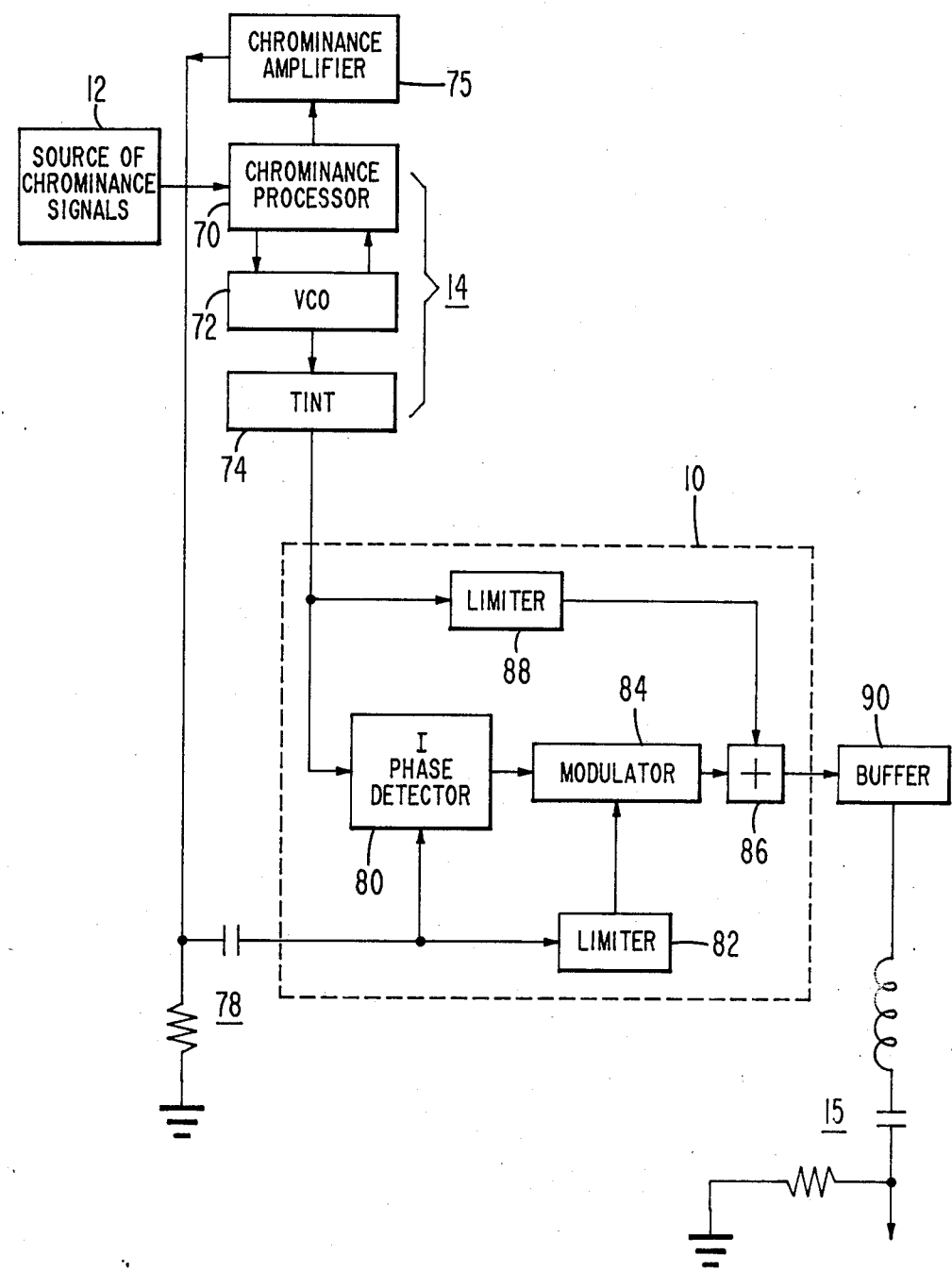
FIG. 3 shows further details of the system of FIG. 1 including a dynamic flesh-tone color correction network.

The I-phase, flesh tone corrected subcarrier signal from control unit 10 is phase shifted 33 degrees by a unit 15, e.g., an inductor-capacitor network as shown in FIG. 3, to produce an R-Y phase subcarrier signal. The phase shifted subcarrier signal from unit 15 is phase shifted 90 degrees by a unit 16, e.g., an inductor-capacitor network, to produce a B-Y phase subcarrier signal. The R-Y phase subcarrier signal from unit 15 and the B-Y phase subcarrier signal from unit 16 are combined in a resistive matrix unit 18 to produce a −(G-Y) phase inverted subcarrier signal.

The R-Y, −(G-Y) and B-Y phase subcarrier signals are respectively applied to reference inputs of R-Y, G-Y and B-Y color difference signal demodulators 20, 22 and 24, and the chrominance information signal from source 12 is applied to a signal input of each of demodulators 20, 22 and 24, whereby demodulators 20, 22 and 24 respectively produce demodulated (i.e., baseband) R-Y, G-Y and B-Y color image difference signal outputs. Additional information concerning the structure of demodulators 20, 22 and 24 will be given with respect to FIG. 2.

A matrix amplifier 30 combines the R-Y, G-Y and B-Y color image difference signals from demodulators 20, 22 and 24 with a luminance component of the television signal (Y) from a source 35 (comprising, e.g., the luminance output of the luminance/chrominance separator) to produce color image representative signals R, G and B. The latter color signals are applied to an image reproducing kinescope of the receiver by means of suitable coupling circuits and driver amplifiers.

Figure 2:
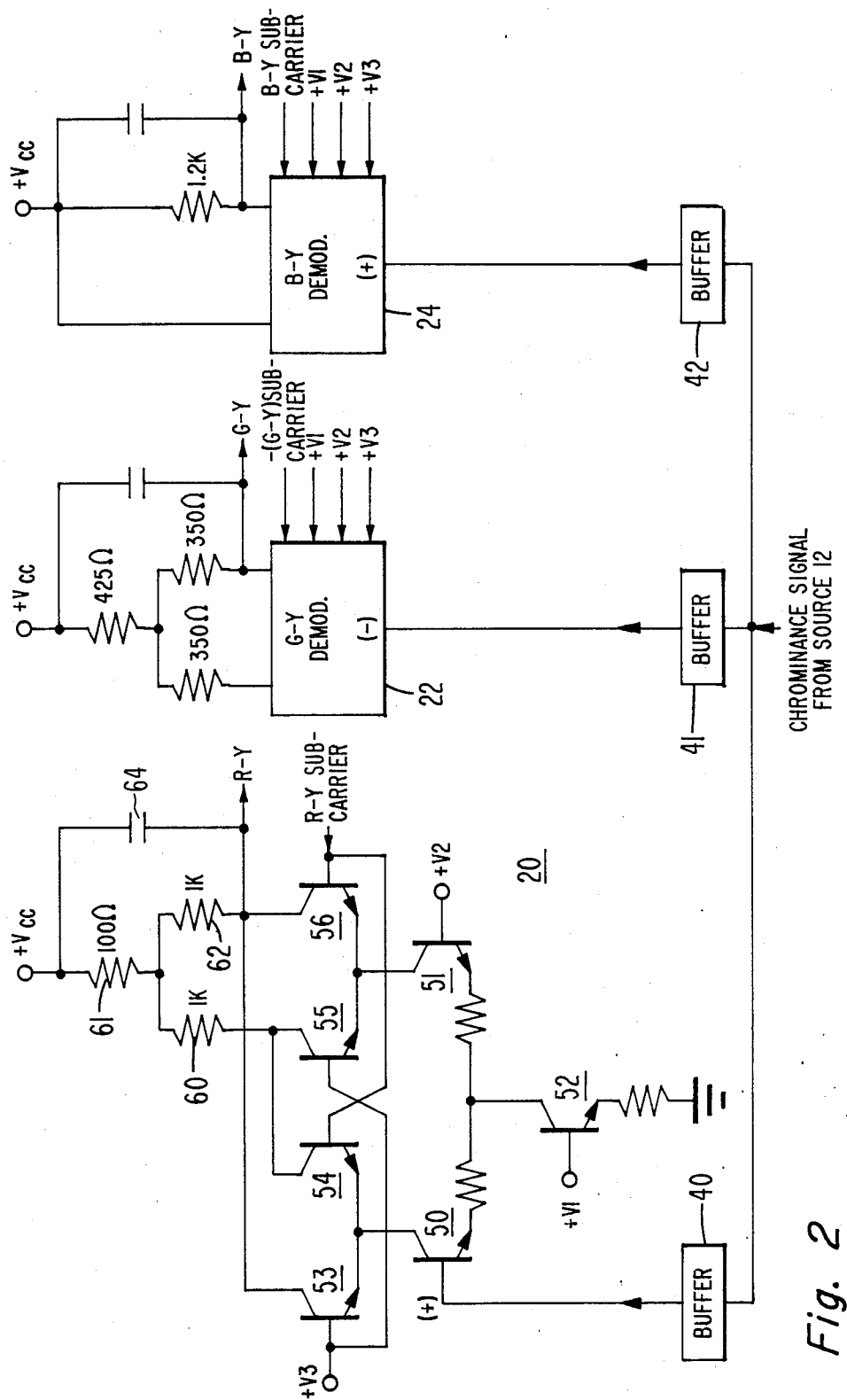
FIG. 2 shows additional details of the demodulating apparatus of FIG. 1.

FIG. 2 shows the circuit configuration of R-Y demodulator 20, which is similar to the configuration of demodulators 22 and 24 (depicted in block form) except with respect to the values of output load resistors as will be explained.

The chrominance signal from source 12 is applied to a non-inverting input (+) of R-Y and B-Y demodulators 20 and 24, and to an inverting input (−) of G-Y demodulator 22, via respective buffers 40-42, i.e., emitter follower transistor stages. Demodulator 20 includes a lower rank pair of differentially connected transistors 50 and 51, respectively corresponding to non-inverting and inverting input transistors, with interconnected emitters coupled to a current source transistor 52 with an associated source of DC bias voltage +V1. The chrominance signal to be demodulated is applied to the non-inverting (+) base input of transistor 50, and a DC bias voltage +V2 is applied to the base of transistor 51.

The collector output of transistor 50 is coupled to the interconnected emitters of a first pair of upper rank differentially connected transistors 53 and 54, and the collector output of transistor 51 is coupled to the interconnected emitters of a second pair of upper rank differentially connected transistors 55 and 56. The R-Y phase subcarrier signal is coupled to the interconnected base electrodes of transistors 54 and 56, and a DC bias voltage +V3 is applied to the interconnected base electrodes of transistors 53 and 55. Oppositely phased collector signal outputs of transistors 53 and 56 are interconnected and coupled via load resistors 61 and 62 to an operating supply potential +VCC. Similarly, oppositely phased collector signal outputs of transistors 54 and 55 are interconnected and coupled via load resistors 60 and 61 to operating potential +VCC. The demodulated R-Y color difference signal appears at the interconnected collector electrodes of transistors 53 and 56, in the output current path including resistors 61 and 62. A low pass filter comprising capacitor 64 and resistor 62 filters the demodulated subcarrier signal to maintain a desired signal bandwidth of approximately 0.5 MHz.

The relative values of the load resistors associated with the respective demodulator signal outputs, e.g., resistors 61 and 62 for R-Y demodulator stage 20, are chosen to maintain a desired ratio of the magnitude of the B-Y output signal to the R-Y output signal, and a desired ratio of the magnitude of the G-Y output signal to the R-Y output signal. Demodulators 20, 22 and 24 also advantageously exhibit substantially equal DC output levels, thereby simplifying interfacing of the demodulated color difference signals with the luminance signal in matrix 30 as shown in FIG. 1. Even though the demodulator load resistors (e.g., resistors 60, 61 and 62 for R-Y demodulator stage 20) exhibit different values for each demodulator stage, under DC conditions the load circuits of each demodulator stage conduct substantially equal DC currents since under DC conditions the effective load resistance of each demodulator stage is substantially 1.2 kilohms. Considering demodulator stage 20 for example, it is noted that the load resistance associated with the joined collectors of transistors 53 and 56 is effectively determined by a 1 kilohm resistor (resistor 62) in series with a 200 ohm resistor (twice the value of resistor 61 which is shared with the collector circuits of transistors 54 and 55), totalling 1.2 kilohms. For G-Y demodulator 22 the effective load resistance is equal to 350 ohms plus twice 425 ohms, or 1.2 kilohms. For B-Y demodulator 24 the effective load resistance is simply 1.2 kilohms.

The described chrominance demodulation system obtains demodulated R-Y, G-Y and B-Y color image difference signals directly rather than by deriving these signals from components along other phase demodulation axes such as the I, Q demodulation axes, and advantageously reduces the likelihood of introducing AC amplitude and DC offset errors. The disclosed system can be constructed with only a single uncomplicated resistive matrix network for deriving the G-Y subcarrier signal, thereby reducing the likelihood of AC amplitude errors being introduced as a result of resistor matrix errors, compared to systems with plural matrices in the demodulator output circuits such as some types of I, Q demodulation systems. Compared to some I, Q demodulation systems, the disclosed system does not require complex signal translating and DC level shifting circuits which could introduce unwanted AC amplitude errors and DC offset errors. As described in connection with FIG. 2, the subcarrier demodulators are arranged to exhibit substantially equal DC output levels to facilitate interfacing with the luminance - chrominance signal matrix.

The described relatively uncomplicated chrominance demodulation system offers an advantageous alternative over a receiver system employing I and Q demodulation to facilitate the use of an automatic flesh tone correction network which responds to chrominance signal phase variations in the vicinity of the I-phase axis.

FIG. 3 shows details of dynamic flesh control network 10 of FIG. 1, wherein corresponding elements are identified by the same reference number.

The chrominance signal from source 12 is processed in a chrominance signal processing unit 70, which in this example includes amplifier stages, sampling networks, automatic color control (ACC) and automatic frequency and phase control (AFPC) detectors, and associated circuits of conventional design. The sampling networks and AFPC detectors, together with a voltage controlled oscillator (VCO) 72 and a tint control network 74, comprise subcarrier reference signal source 14.

Output signals from processor 70 are supplied to VCO 72 (e.g., of the type described in U.S. Pat. No. 4,020,500), which is arranged to regenerate a continuous wave subcarrier reference signal from the burst component which is customarily provided in a broadcast color television signal. An output subcarrier signal from VCO 72 is supplied as an input to sampling and detector circuits in processor 70, which monitor the phase and frequency of the oscillator subcarrier signal and provide appropriate control signals for locking the oscillator signal phase to the burst phase, which corresponds to the −(B-Y) color difference signal phase.

Another output of VCO 72 is applied to tint (hue) control unit 74 (e.g., of the type shown in U.S. Pat. No.

4,051, 512) which may be adjusted either electronically or manually to shift the phase of the oscillator subcarrier signal and thereby produce a change in the hue of a reproduced image. Tint control network 74 includes a phase shifting circuit for shifting the phase of the subcarrier signal so that a nominal I-phase subcarrier signal is produced, which I-phase subcarrier signal is subject to being phase shifted to change the hue of a reproduced image. The I-phase subcarrier from tint control unit 74 is coupled to one input of dynamic flesh control unit 10, shown in block diagram form. Another input of flesh control unit 10 is supplied with amplified chrominance signals which are coupled from an output of chrominance amplifier 75 via an AC coupling network 78.

As discussed in greater detail in U.S. Pat. No. 3,996,608, the AC coupled chrominance signal from amplifier 75 is supplied to one input of an I phase detector 80, and to a chrominance signal amplitude limiting amplifier 82. Another input of phase detector 80 is supplied with the subcarrier signal from tint network 74. The amplitude limited chrominance signal output of limiter 82 is coupled to one input of a signal modulator 84. The output of phase detector 80, which is the product of the applied chrominance and subcarrier signals, is applied to a second input of modulator 84 to selectively vary the amplitude of the limited chrominance signal which is applied to an input of a signal combining network 86. An amplitude limited subcarrier signal from an output of a signal limiter 88 is coupled to combining network 86 where it is vectorially combined with selected portions of the amplitude limited chrominance signal from modulator 84.

Phase detector 80 detects the presence of flesh tone chrominance signals. Detector 80 multiplies the applied chrominance and subcarrier signals to provide a maximum output when the chrominance signal phase is coincident with the I-phase axis, and a decreasing output is provided as the chrominance signal phase departs from the I axis. Thus, when the chrominance signal phase is in the vicinity of flesh tone phase, detector 80 controls the transfer characteristic of modulator 84 to pass more or less of the amplitude limited chrominance signal output of limiter 82 according to the phase displacement between the subcarrier and chrominance signals. The resulting controlled portion of the amplitude limited chrominance signal combines with the limited subcarrier signal in combining network 86 to produce a new, flesh tone corrected, subcarrier signal the phase of which is shifted toward that of the chrominance signal.

A buffer 90, such as a transistor emitter follower stage, couples the output subcarrier signal from network 10 to phase shifting network 15. Network 15 includes a series resonant inductor - capacitor network for imparting a 33 degree phase shift to the subcarrier signal to develop an R-Y phase subcarrier signal as discussed, and also for attenuating undesirable high frequency (harmonic) components attributable to the action of switching circuits contained in network 10. Network 15 is illustratively tuned to approximately 4.0 MHz, slightly above the burst related subcarrier signal frequency of approximately 3.58 MHz.

What is claimed is:

1. In a system for processing a video signal having a chrominance component containing color modulation information and a subcarrier burst reference component, apparatus for fleshtone correction and for demodulating said chrominance component comprising means responsive to said burst component for developing a subcarrier having a phase along an I-phase demodulation axis, about which axis are chrominance signal components containing fleshtone information; and automatic fleshtone control means, responsive to said I-phase subcarrier signal and to said chrominance component, for providing an output phase controlled flesh tone corrected I-phase subcarrier signal having a phase related to image fleshtone phase when the phase of said chrominance component is within a range of phases corresponding to a nominal range of fleshtone phase;

wherein to maintain the quality of chrominance components containing fleshtone information by reducing the likelihood of introducing AC amplitude errors and DC offset errors of the type subject to being produced by an I-phase demodulator system with an associated matrix circuit, the improvement comprising:

means for translating said phase controlled fleshtone corrected I-phase subcarrier output signal from said control means to produce plural subcarrier signals with phases respectively related to R-Y, G-Y and B-Y color difference signal phases; and plural signal demodulators each having a signal input for receiving said chrominance component to be demodulated, and a control input for receiving respective ones of said R-Y, G-Y and B-Y phase subcarrier signals for directly producing output demodulated R-Y, G-Y and B-Y color image difference signals.

2. Apparatus according to claim 1, wherein each of said demodulators comprises a resistive output circuit, said resistive output circuits exhibiting substantially the same effective resistance such that said output circuits conduct substantially equal DC currents under DC conditions.

3. Apparatus according to claim 2, wherein one of said demodulators has first and second mutually oppositely phased output current conducting paths;
a first resistor included in said first current path is coupled to a circuit node;
a second resistor included in said second current path is coupled to said circuit node;
a third resistor couples said circuit node to an operating potential; and
an output signal from said one demodulator is derived from said first current path.

4. Apparatus according to claim 1, wherein said translating means comprises:
first and second phase shifting means for generating first and second ones of said R-Y, G-Y and B-Y phase subcarrier signals; and
matrix means responsive to said generated first and second ones of said subcarrier signals for developing a third one of said R-Y, G-Y and B-Y phase subcarrier signals.

5. Apparatus according to claim 1, wherein said translating means comprises
first phase shifting means responsive to said I-phase subcarrier signal for generating said R-Y phase subcarrier signal;
second phase shifting means responsive to said generated R-Y phase subcarrier signal for generating said B-Y phase subcarrier signal; and
matrix means for combining output signals from said first and second phase shifting means to produce said G-Y phase subcarrier signal.

* * * * *